Oct. 13, 1925.  
C. L. HASELTINE  
1,557,456  
HITCH FOR MACHINES AND WAGONS  
Filed Dec. 21, 1922 2 Sheets-Sheet 1
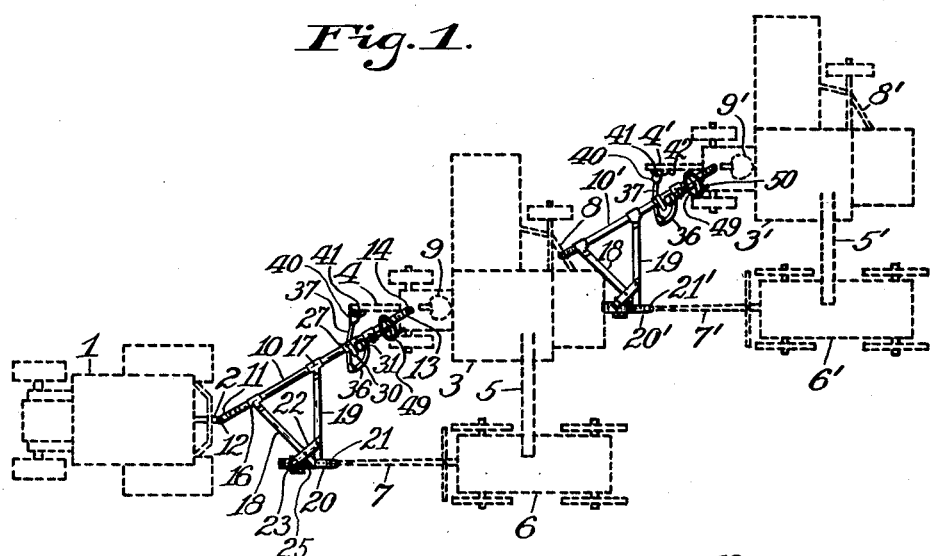
Fig. 1.
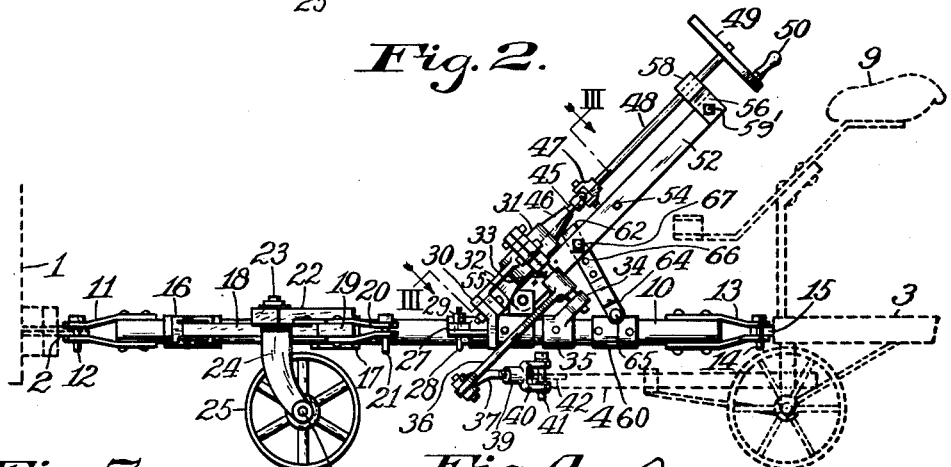
Fig. 2.
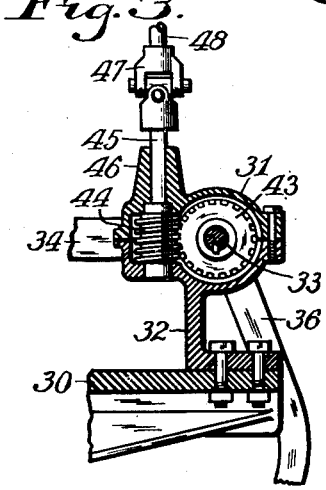
Fig. 3.
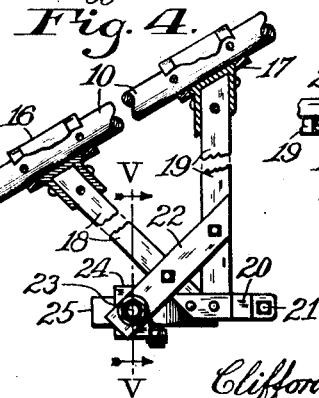
Fig. 4.
Fig. 5.
INVENTOR:
Clifford L. Haseltine,
BY
E. T. Silvius,
ATTORNEY.

Oct. 13, 1925.
C. L. HASELTINE
HITCH FOR MACHINES AND WAGONS
Filed Dec. 21, 1922 — 2 Sheets-Sheet 2
1,557,456
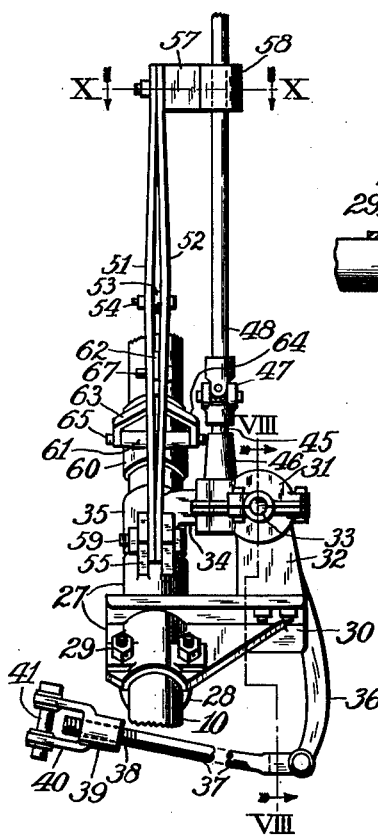
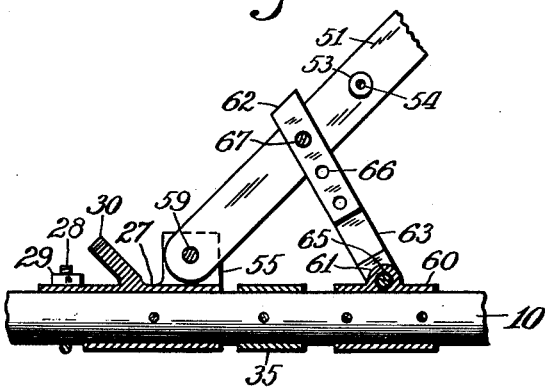
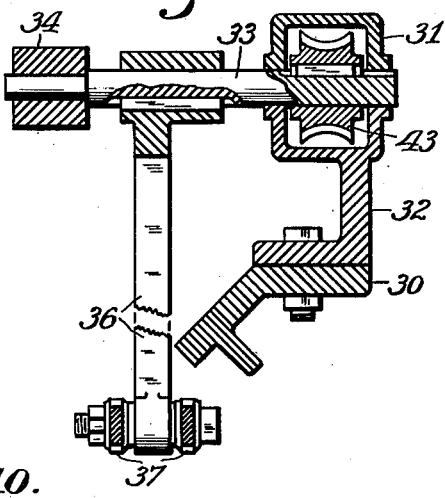
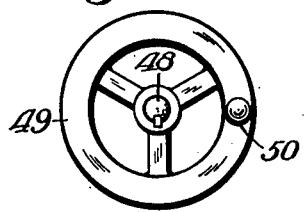
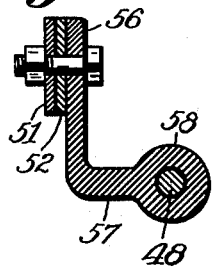
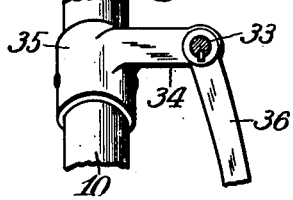
INVENTOR:
Clifford L. Haseltine,
BY
E. T. Silvius,
ATTORNEY.

Patented Oct. 13, 1925.

1,557,456

UNITED STATES PATENT OFFICE.

CLIFFORD L. HASELTINE, OF CARR CREEK TOWNSHIP, MITCHELL COUNTY, KANSAS.

HITCH FOR MACHINES AND WAGONS.

Application filed December 21, 1922. Serial No. 608,176.

*To all whom it may concern:*

Be it known that I, CLIFFORD L. HASELTINE, a citizen of the United States, residing in Carr Creek Township, in the county of Mitchell and State of Kansas, have invented a new and useful Hitch for Machines and Wagons, of which the following is a specification, reference being had to the accompanying drawings and to the letters and figures of reference marked thereon.

This invention relates to an apparatus commonly known as a "hitch" and designed to be used for pulling machines or vehicles by means of a tractor and to be guided relatively to the path of the tractor, the invention having reference more particularly to a hitch of the above-mentioned character that is adapted to be used for drawing two machines or vehicles side by side either by means of a tractor or by one of the two machines or vehicles, especially when it is desired that one harvester-and-thresher shall pull another harvester-and-thresher and an attending wagon.

An object of the invention is to provide a hitch which shall be so constructed as to be adapted for easily steering or guiding harvesting machines, mowing machines or vehicles when drawn by a tractor and in echelon arrangement, particularly so as to ordinarily be under control of one attendant for all the machines or vehicles.

Another object is to provide a hitch of the above-mentioned character which shall be adapted for pulling and steering a harvesting machine and also a wagon to receive grain or produce from the machine, which hitch shall have steering apparatus of such character as to be adapted to remain set after having been operated and adjusted.

Another object is to provide an improved steering hitch which shall be strong and reliable in operation, while being of simple construction and not costly to manufacture, and which shall be durable and economical in use.

With the above-mentioned and other objects in view, the invention consists in a hitch provided with improved steering mechanism adapted to be readily adjusted and to be maintained in adjusted position until manually re-adjusted, the hitch preferably being provided with a plurality of draft devices to which a plurality of machines or vehicles may be connected to be drawn in unison one with another; and, the invention consists also further in the novel parts and in the combinations and arrangements of parts as hereinafter particularly described and further defined in the claims appended hereto.

Referring to the drawings,—Figure 1 is a diagrammatic view showing the relative arrangement of two harvesting machines and a tractor, as when in operation, and wagons attending the machines, each machine and a wagon being drawn by a hitch constructed substantially in accordance with the invention, parts of the hitch being omitted, the view being intended to illustrate the general purpose of the invention rather than the specific construction thereof; Fig. 2 is a side elevation of the hitch indicated as being connected with a tractor and a harvester; Fig. 3 is a fragmentary section approximately on the line III—III in Fig. 2 on an enlarged scale; Fig. 4 is a fragmentary top plan of the forward portions of the hitch showing particularly the means for pulling a wagon thereby; Fig. 5 is a fragmentary section on the line V—V in Fig. 4; Fig. 6 is a fragmentary top plan, partially in perspective and showing particularly the steering apparatus of the hitch, on an enlarged scale; Fig. 7 is a fragmentary sectional detail of the hitch on an enlarged scale; Fig. 8 is a fragmentary section approximately on the line VIII—VIII in Fig. 6 on an enlarged scale; Fig. 9 is a top plan of the steering wheel keyed to a steering shaft of the apparatus; Fig. 10 is a fragmentary section on the line X—X in Fig. 6 on an enlarged scale; and, Fig. 11 is a fragmentary detail showing parts on an enlarged scale which are partially obscured in other views.

Similar reference characters in the different figures of the drawings indicate corresponding elements or features of construction herein referred to in detail.

In the drawings the numeral 1 indicates a tractor or power-driven vehicle provided with a suitable draft device 2; 3 indicates a harvester-and-thresher arranged to be drawn so as to cut grain along one side of the path of the tractor, the machine being provided with a stub pole or tongue 4 for steering it and being provided at one side with a discharge pipe 5 arranged to conduct threshed grain to an accompanying wagon 6 having a conventional guiding tongue 7, the machine being provided with a suitable draft device 8 whereby to pull a second machine 3' having a steering pole or tongue 4' a discharge pipe 5' to conduct grain to an attending wagon 6' having a tongue 7', the machine being provided with a draft device 8' so that it may draw still another machine, and adapting the machine to be drawn directly by the tractor and to draw a second machine. One harvester is provided on its front portions with an operator's seat 9, the other machine having a similar seat 9'.

While the description refers to machines for harvesting grain as illustrating one of the purposes of the hitch, it will be apparent that the hitch may be applied to other machines, such as potato harvesters.

A practical embodiment of the invention comprises a draw-bar 10 which preferably is straight and may be either solid or hollow, being the main portion of the hitch apparatus and provided on its normal forward end with a suitable coupler or draft device 11 adapted to be connected to the draft device 2 on the tractor, preferably by means of a pivotal coupling pin 12; the opposite end of the draw-bar being provided with a coupler or draft device 13 provided with a coupling pin 14 whereby to pivotally connect the draw-bar to a suitable lug 15 on the machine 3 or trailing machine 3', the coupler device 11 being of such design as to enable it to be connected to the draft device 8 of a leading machine. The hitch apparatus preferably includes a side arm or branch whereby to draw a wagon along with the harvester machine, and to this end the draw-bar 10 or main portion of the hitch is provided with a base collar 16 in proximity to the forward coupler device 11 and another collar 17 at a suitable distance from the forward collar, the arm comprising two members 18 and 19 secured to the collars respectively and extending convergently each to the other. A draft device 20 is secured to the arm members adjacent to their ends and is adapted to have a wagon tongue 7 connected thereto, preferably by means of a coupling pin 21. The arm is provided with a caster to support it, an arm member 22 preferably being arranged transversely upon the members 18 and 19 and secured thereto, the member 22 extending forwardly beyond the member 18, the caster having a spindle 23 rotatably arranged in the arm member 22 and having a fork 24 connected thereto, a wheel 25 being arranged in the fork and connected thereto by means of a suitable axle 26.

The hitch apparatus preferably includes a complete steering apparatus, and to this end the draw-bar has a base 27 fixed thereon, preferably being bolted or riveted in place and further secured by means of a U-bolt 28 and nuts 29. The base 27 has a frame arm 30 rigidly fixed thereon that extends laterally at a suitable distance rearward of the arm member 19. A gear case 31 is provided which has a bracket 32 that is rigidly connected to the arm 30, the gear case rotatably supporting a portion of a steering shaft 33 which is supported also by an arm 34 on a collar 35 secured on the draw-bar 10. A steering arm 36 is keyed or otherwise secured to the shaft 33. The shaft 33 is arranged at an inclination relatively to the draw-bar, and the arm 36 extends downwardly at an inclination opposite to one side of the draw-bar, being the side from which the arm member 19 extends, and a steering rod 37 is pivoted to the arm 36 and extends below the draw-bar and preferably is adjustable as to length, the rod preferably having screw threads 38 thereon that are engaged by a shackle body 39 suitably threaded and having fingers 40 provided with a coupling pin 41 for connection with the tongue or pole 4 of the harvesting machine, the tongue being in some cases provided with a suitable pivot block or clevis 42 to which the pin 41 may be directly connected. A suitable gear wheel 43 is arranged in the gear case 31 and keyed or otherwise secured to the shaft 33, and it is engaged by a worm 44 which has an operating shaft 45 rotatably supported in the gear case and guided in an extension 46 with which the gear case preferably is provided, a universal coupling 47 being connected to the shaft and to which a shaft 48 is connected that has a steering wheel 49 secured thereto, the wheel preferably having a crank handle 50 whereby to rapidly rotate the wheel and the shaft. An adjustable steering column is provided which preferably comprises two beams 51 and 52 having a spacer thimble 53 arranged between the middle portions thereof and secured in place by means of a bolt 54, the ends of the beams being drawn together. The beams are inclined above the draw-bar and the lower portions thereof are suitably connected to ears 55 with which the base 27 is provided. An arm 56 is secured to the upper portions of the beams and it has a lateral member 57 thereon provided with a guide box 58 in which the shaft 48 is rotatably guided. It being preferable to provide the steering shaft with the universal coupling 47, the steering column preferably is connected to the ears 55 by means of a pivot 59, to permit the steering wheel 49 by means of the column to be adjusted relatively to the seat 9 on the harvester machine, the steering column being connected to a brace comprising a base collar 60 secured on the draw-bar and having a long boss 61 on its top. The brace has a single member 62 arranged between the beams 51 and 52, and two yoke arms 63 and 64 that are connected to the boss 61 by means of a pivot 65. The bar 62 has pin holes 66 therein in one of which is placed a pin 67 that extends through the beams 51 and 52, permitting angular adjustment of the steering column on its pivot 59 which allows the arm 56 to take a proper position.

In practical use the coupler device 11 is connected to the tractor and the coupler device 13 is connected to the machine required to be operated in the field, the machine being set as is customary to permit the machine to cut the standing grain while the tractor runs on the ground where the grain has previously been cut therefrom. A wagon tongue is connected to the draft device 20 and permits the wagon to be pulled along under the end of the discharge pipe with which the machine is provided. The steering wheel 49 is operated so as to adjust the arm 36 which guides the tongue or pole 4, re-adjustments being made when necessary to insure proper cutting of the grain, as the tractor may not always properly guide the harvester machine. When it is desired to hitch a second harvester to the first one, it is arranged approximately as indicated in Fig. 1 and drawn by one of the hitch apparatus, the steering mechanism of which may be properly set and left to guide the second machine and the wagon, the worm 44 preventing the gear 43 from accidentally turning and changing the adjustment of the arm 36, so that one attendant under ordinary circumstances on the leading machine need only steer that machine, the trailer following properly. While the carrying wheel 25 and its frame supports and guides the arm to which it is connected it prevents the draw-bar from turning over when the steering thrusts are imparted to the arm 36. In case the steering wheel 49 is not in convenient position for the attendant on the seat 9 it may be readily lowered or raised by shifting the pin 67 in the brace bar 62.

What I claim as new is:

1. A unitary hitch apparatus including a straight draw-bar and a lateral draft arm rigidly secured to the draw-bar, the opposite ends of the draw-bar and the end of the arm having each a draft device, the end of the arm being provided with a device to support the end independently of the draw-bar.

2. A unitary hitch apparatus including a draw-bar having a lateral draft arm rigidly connected thereto, the draw-bar being adapted to draw a machine, and steering gearing mounted on and carried by the draw-bar and comprising a controlled movable steering arm and a steering rod pivoted thereto, the rod extending transversely relatively to the draw-bar to variably guide the machine.

3. A hitch apparatus including a draw-bar with draft devices on its opposite ends, a gear shaft mounted on one side of the draw-bar, an arm secured to the gear shaft, a steering rod pivoted to the arm and arranged to operate below and transversely of the draw-bar, and gearing connected with the gear shaft to rotate it or to hold the shaft against rotation.

4. A hitch apparatus including a straight main draw-bar with draft devices on its opposite ends, a draft arm secured to one side of the main draw-bar and having a draft device on its end, a caster wheel connected with the arm to carry the arm, a gear shaft mounted on said side of the main draw-bar, a steering arm secured to the gear shaft, a steering rod pivoted to the steering arm and extending transversely below the draw-bar, and gearing connected with the gear shaft to rotate the shaft or to hold it against rotation.

5. A hitch apparatus including a draw-bar having a lateral draft arm, the arm being provided with a caster to support it, a gear shaft rotatively mounted on the draw-bar and having a steering arm secured thereto, a steering rod pivoted to the steering arm and having a shackle thereon, a steering column mounted on the draw-bar, worm gearing connected with the gear shaft and provided with supporting means, a steering shaft connected with the worm gearing and guided by the steering column, and a steering wheel secured to the steering shaft.

6. A hitch apparatus including a draw-bar, draft-devices on the opposite ends respectively of the draw-bar, a base secured to the draw-bar and having an arm thereon, a gear case mounted on the arm, a gear shaft rotatively guided in the gear case and having a steering arm secured thereto, a steering rod pivoted to the steering arm and having a shackle on its end, a bracket secured to the draw-bar and supporting the gear shaft, and means connected with the gear shaft in the gear case to rotate the shaft or to hold it against rotation.

7. A hitch apparatus including a draw-bar and draft devices on the opposite ends thereof, a gear case having supporting means fixed to the draw-bar, a gear shaft rotatively supported in the gear case and extending downwardly therefrom, a bracket secured to the draw-bar and supporting the lower portion of the gear shaft, a steering arm secured to the gear shaft between the gear case and the bracket, a steering rod pivoted to the steering arm and having a shackle on its end, a gear wheel in the gear case and secured to the gear shaft, and a worm rotatably supported by the gear case in mesh with the gear wheel and having an operating-shaft.

8. In a hitch apparatus, a draw-bar having a draft device on one side and a steering device projecting beyond the opposite side thereof and exerting lateral thrust tending to rotate the draw-bar, the devices being provided with counter-balance guiding means to prevent over-turning of the draw-bar.

9. In a hitch apparatus the combination of a draw-bar provided on one side thereof with interlocking gearing having a steering arm and a steering rod pivoted to the arm, a steering column mounted upon the top of the draw-bar and having a lateral guide thereon, and a steering shaft connected with the interlocking gearing and guided in the lateral guide on one side of the steering column.

10. In a hitch apparatus, the combination with a draw-bar, of a draft arm secured to the draw-bar and extending laterally therefrom, the arm being provided with a draft device and also a caster frame, a wheel mounted in said frame, a steering column mounted upon the draw-bar, power gearing mounted on the draw-bar and having a steering arm, a steering rod connected to the steering arm, and a steering shaft connected with the power gearing and guided by the steering column.

11. In a hitch apparatus, the combination of a draw-bar, a gear case mounted on the draw-bar, power gearing mounted in the gear case and provided with a steering arm, a steering rod connected to said arm, a shackle adjustably connected to said rod, a brace pivotally supported on the draw-bar, a steering column pivotally supported on the draw-bar and having a guide bracket thereon, the column being connected adjustably to said brace, a steering shaft connected with the power gearing and having a universal joint therein, the steering shaft being guided in said guide, and a caster-supported arm connected to the draw-bar to draw a wagon.

In testimony whereof, I affix my signature on the 14th day of December, 1922.

CLIFFORD L. HASELTINE.